US010955129B2

(12) United States Patent
Mizobe

(10) Patent No.: US 10,955,129 B2
(45) Date of Patent: Mar. 23, 2021

(54) LAMP

(71) Applicant: NEC LIGHTING, LTD., Tokyo (JP)

(72) Inventor: Norimasa Mizobe, Tokyo (JP)

(73) Assignee: HotaluX, Ltd., Tokyo (JP)

( * ) Notice: Subject to any disclaimer, the term of this patent is extended or adjusted under 35 U.S.C. 154(b) by 0 days.

(21) Appl. No.: 16/338,387

(22) PCT Filed: Nov. 24, 2017

(86) PCT No.: PCT/JP2017/042267
§ 371 (c)(1),
(2) Date: Mar. 29, 2019

(87) PCT Pub. No.: WO2018/142731
PCT Pub. Date: Aug. 9, 2018

(65) Prior Publication Data
US 2019/0234607 A1    Aug. 1, 2019

(30) Foreign Application Priority Data

Jan. 31, 2017   (JP) ................................. 2017-015990

(51) Int. Cl.
| | |
|---|---|
| *F21V 29/90* | (2015.01) |
| *F21S 2/00* | (2016.01) |
| *F21Y 115/10* | (2016.01) |
| *B64F 1/18* | (2006.01) |
| *F21V 3/00* | (2015.01) |
| *F21V 7/04* | (2006.01) |

(Continued)

(52) U.S. Cl.
CPC ................ *F21V 29/90* (2015.01); *B64F 1/18* (2013.01); *B64F 1/20* (2013.01); *F21S 2/00* (2013.01);
(Continued)

(58) Field of Classification Search
CPC .......... F21S 43/14; F21S 43/00; F21S 41/141; B64D 2203/00; F21V 29/90
See application file for complete search history.

(56) References Cited

U.S. PATENT DOCUMENTS

| | | | | |
|---|---|---|---|---|
| 4,745,343 A | * | 5/1988 | Beggs ................... | H05B 41/30 |
| | | | | 313/113 |
| 2006/0011598 A1 | * | 1/2006 | Yasuda .................... | F21V 3/04 |
| | | | | 219/205 |

(Continued)

FOREIGN PATENT DOCUMENTS

| | | |
|---|---|---|
| JP | 10-289602 A | 10/1998 |
| JP | 2000-173304 A | 6/2000 |

(Continued)

OTHER PUBLICATIONS

International Search Report for PCT/JP2017/042267 dated Jan. 23, 2018 (PCT/ISA/210), English translation.

*Primary Examiner* — Jong-Suk (James) Lee
*Assistant Examiner* — Eric T Eide
(74) *Attorney, Agent, or Firm* — Sughrue Mion, PLLC

(57) ABSTRACT

The present invention provides a lamp capable of preventing snow accretion and freezing of melted snow. The lamp is a lamp (10) including an LED module (11) serving as a light source, a light distribution unit (12), a conductive film heater (13), a casing (14), and a light transmissive cover (16). The LED module (11) includes a plurality of LEDs and an LED substrate on which the plurality of LEDs are mounted. The LED module (11), the light distribution unit (12), and the conductive film heater (13) are disposed in the casing (14). The light distribution unit (12) is disposed on a light emitting side of the LED module (11). The light transmissive cover (16) is disposed over the opening of the casing (14). The conductive film heater (13) is disposed on a surface of the light transmissive cover (16) on an inner side of the casing (14).

5 Claims, 4 Drawing Sheets

(51) Int. Cl.
  *F21V 5/04*  (2006.01)
  *F21V 3/04*  (2018.01)
  *B64F 1/20*  (2006.01)
  *B64F 1/00*  (2006.01)

(52) U.S. Cl.
  CPC ............... *F21V 3/00* (2013.01); *F21V 3/04* (2013.01); *F21V 5/04* (2013.01); *F21V 7/04* (2013.01); *B64D 2203/00* (2013.01); *B64F 1/002* (2013.01); *F21Y 2115/10* (2016.08)

(56) References Cited

U.S. PATENT DOCUMENTS

| | | | |
|---|---|---|---|
| 2007/0181565 A1* | 8/2007 | Murahashi | B60Q 1/0005 219/629 |
| 2007/0263376 A1* | 11/2007 | Wilkinson | B60Q 1/2611 362/35 |
| 2009/0279287 A1* | 11/2009 | Tartock | F21S 8/081 362/153.1 |
| 2013/0114279 A1* | 5/2013 | Marley | F21S 41/141 362/516 |
| 2013/0249375 A1* | 9/2013 | Panagotacos | H05B 33/0803 313/13 |
| 2014/0264395 A1* | 9/2014 | Lee | H01L 27/15 257/88 |

FOREIGN PATENT DOCUMENTS

| | | |
|---|---|---|
| JP | 2006-156287 A | 6/2006 |
| JP | 2007-242291 A | 9/2007 |
| JP | 2008-112628 A | 5/2008 |
| JP | 2010-182495 A | 8/2010 |
| JP | 2010-247576 A | 11/2010 |

* cited by examiner

LAMP

CROSS REFERENCE TO RELATED APPLICATIONS

This application is a National Stage of International Application No. PCT/JP2017/042267 filed Nov. 24, 2017, claiming priority based on Japanese Patent Application No. 2017-015990, filed Jan. 31, 2017.

TECHNICAL FIELD

The present invention relates to a lamp.

BACKGROUND ART

Conventionally, a flash device using a xenon lamp has been used for guiding a landing aircraft to a runway in airports and the like (see Patent Literatures 1 to 4).

CITATION LIST

Patent Literatures

Patent Literature 1: JP 2006-156287 A
Patent Literature 2: JP 2008-112628 A
Patent Literature 3: JP 2010-182495 A
Patent Literature 4: JP 2010-247576 A

SUMMARY OF INVENTION

Technical Problem

If the xenon lamp is replaced with a light-emitting diode (LED) lamp, it is possible to greatly extend the life and reduce the power consumption. However, LED lamps generate less heat during light emission than xenon lamps. Thus, for example, in cold climate areas, such as Hokkaido and Alaska, snow accretion on a light transmissive cover covering the front surface of the lamp may occur, or melted snow after the snow accretion may be frozen, thereby impairing the function of the flash device.

Hence, it is an object of the present invention to provide a lamp using an LED(s) capable of preventing snow accretion and freezing of melted snow.

Solution to Problem

In order to achieve the aforementioned object, according to the present invention, there is provided a lamp which includes: an LED module serving as a light source; a light distribution unit; a conductive film heater; a casing including an opening; and a light transmissive cover. In the lamp, the LED module includes plural LEDs and an LED substrate on which the plural LEDs are mounted. The LED module, the light distribution unit, and the conductive film heater are disposed in the casing. The light distribution unit is disposed on a light emitting side of the LED module. The light transmissive cover is disposed over the opening of the casing. The conductive film heater is disposed on a surface of the light transmissive cover on an inner side of the casing.

Advantageous Effects of Invention

The present invention can provide a lamp using an LED(s) capable of preventing snow accretion and freezing of melted snow.

DESCRIPTION OF EMBODIMENTS

Figure 1:
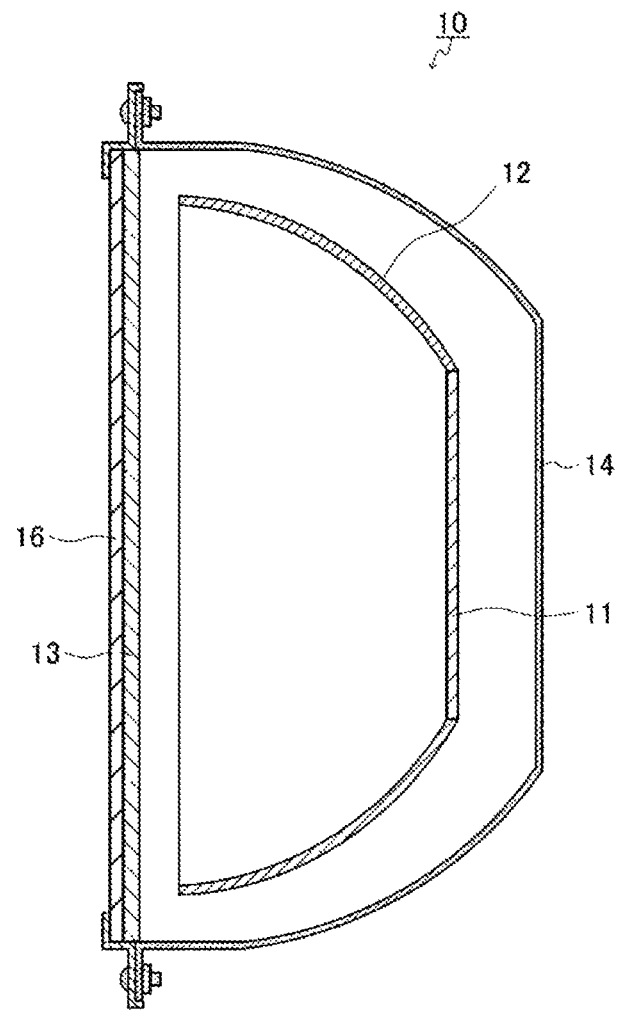
FIG. 1 is a cross-sectional view showing an example configuration of a lamp according to the first embodiment.

In the lamp of the present invention, the conductive film heater is, for example, a transparent conductive film.

In the lamp of the present invention, the conductive film heater is, for example, an ITO conductive film.

In the lamp of the present invention, the light distribution unit includes, for example, at least one of a reflector or a lens.

In the lamp of the present invention, the reflector has, for example, a tubular shape, the LED module is disposed at an opening of the reflector on the light source side, and the LED-mounting surface of the LED substrate faces an opening of the reflector on a light emitting side.

The lamp of the present invention is for use in an aircraft landing guidance flash device.

Descriptions will be made as regards the lamp of the present invention more in detail with reference to the drawings in the following. The present invention, however, is by no means limited thereby. In FIGS. 1 to 4 to be described below, the identical parts are denoted by identical reference numerals.

First Embodiment

The present embodiment shows an example of the lamp of the present invention. The lamp according to the present embodiment is for use in an aircraft landing guidance flash device. The present invention, however, is by no means limited thereby. An example configuration of the lamp according to the present embodiment is shown in the cross-sectional view of FIG. 1.

As shown in FIG. 1, a lamp 10 includes an LED module 11, a light distribution unit 12, a conductive film heater 13, a casing 14, and a light transmissive cover 16. The LED module 11, the light distribution unit 12, and the conductive film heater 13 are stored in the casing 14. The light transmissive cover 16 is disposed over the opening of the casing 14. The conductive film heater 13 in the casing 14 is disposed on a surface of the light transmissive cover 16 on an inner side of the casing (14).

The LED module 11 is a light source of the lamp 10. The LED module 11 includes a plurality of LEDs and an LED substrate on which the plurality of LEDs are mounted. The surface of the LED substrate on which the LEDs have been mounted (the surface on the left side in FIG. 1) is hereinafter referred to as an LED-mounting surface. In the LED module 11, the size and the material of the LED substrate, the number of LEDs mounted on the LED substrate, an emitting color by the LED(s), and the like are not particularly limited. When the lamp 10 is for use in the flash lighting system, the brightness of the lamp 10 is, for example, preferably the same or more of the brightness of the xenon lamp for use in a conventional flash lighting system, and the conditions of the LED substrate and the LED(s) in the LED module 11 can be set, as appropriate, according to, for example, the desired brightness.

The light distribution unit 12 is disposed on a light emitting side of the LED module 11. That is, in FIG. 1, the light distribution unit 12 is disposed on the side in a direction in which the LED module 11 emits light (left side of the LED module 11). The light distribution unit 12 is a unit that transmits light emitted from the LED module 11 toward the light transmissive cover 16 side by, for example, reflection, light gathering, and diffusion. The kind of the light distribution unit 12 is not particularly limited, and examples thereof include a reflector (reflection plate) and a lens. The light distribution unit 12 may be either one of the reflector and the lens, or both of them may be used in combination as the light distribution unit 12.

When the light distribution unit 12 is a reflector, the material for forming the reflector is not particularly limited, and examples thereof include; metals such as aluminium, magnesium, and an alloy thereof; and resins such as polycarbonate (PC) and polybutylene terephthalate (PBT). As the reflector, a reflector having a reflection surface subjected to high reflection processing to further improve reflection efficiency may be used, for example. The high reflection processing is, for example, plating, application of a highly reflective coating material.

When the light distribution unit 12 is a reflector, the shape of the reflector is not particularly limited. The reflector has, for example, a tubular shape as shown in FIG. 1. It is preferred that an LED mounting region on the LED-mounting surface of the LED module 11 is positioned at an opening (right side in FIG. 1) of the tubular reflector, and the inside of the tubular reflector is irradiated with light emitted from the LED module 11. The inner wall of the reflector may be, for example, as shown in FIG. 1, tapered from the LED module 11 toward an opening of the casing 14, and this shape is also referred to as, for example, an umbrella-like shape. An cross section of the inner wall of the tubular reflector from the LED module 11 toward the opening of the casing 14 may have, for example, an arc shape as shown in FIG. 1 or a flat linear shape.

Figure 2:
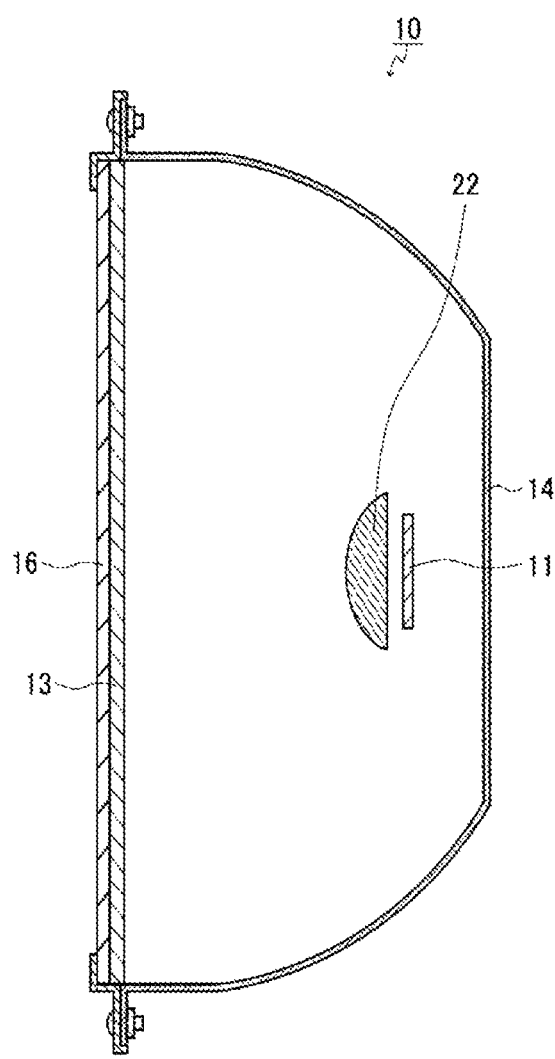
FIG. 2 is a cross-sectional view showing another example configuration of the lamp according to the first embodiment.

The light distribution unit 12 may be, for example, a lens as mentioned above. A cross-sectional view of FIG. 2 shows an example configuration of the lamp 10 wherein the light distribution unit is a lens 22. As shown in FIG. 2, the lens 22, which is the light distribution unit, is disposed on the LED-mounting surface side of the LED module 11 so as to receive light emitted from the LED module 11 and distribute the light by diffusion, scattering, or the like, for example. The lens 22 can be, for example, a convex lens in which the surface on the opening side of the casing 14 is a spherical surface.

The light transmissive cover 16 is disposed over the opening of the casing 14 and transmits light from the inside of the casing 14. The material for forming the light transmissive cover 16 is required to be capable of transmitting most of light emitted from the LED module 11, for example, and is not particularly limited. A specific example of the material for forming the light transmissive cover 16 can be, for example, glass. When the lamp of the present invention is a flashing light in an airfield, the light transmissive cover 16 has, for example, a diameter of 15 to 25 cm in size.

The conductive film heater 13 is disposed on a part of the surface or the entire surface of the light transmissive cover 16 on the inner side of the casing 14. In the former case, the number of conductive film heaters 13 relative to the light transmissive cover 16 may be one or more. A site on the surface of the light transmissive cover 16, at which the conductive film heater 13 is disposed, is not particularly limited. For example, it is preferred that the conductive film heater 13 is disposed so that a surface temperature distribution of the light transmissive cover 16 during driving of the conductive film heater 13 becomes a distribution centered on the center of the light-transmissive cover 16 in the plane direction. A site at which the conductive film heater 13 is disposed is, for example, in a region including the center (central portion) of the light transmissive cover 16, and the central portion is preferable because of being prone to be in contact with snow outside.

The size of the conductive film heater 13 is not particularly limited and can be set, as appropriate, according to, for example, the sizes of the lamp of the present invention and the light transmissive cover 16. The area of the conductive film heater 13 is 0.1 to 1 as a relative value assuming that the surface of the light transmissive cover 16 is 1, for example.

The conductive film heater 13 may be disposed directly or indirectly on the surface of the light transmissive cover 16. The former case includes, for example, a configuration where a conductive film heater 13 and the light transmissive cover 16 are integrated by forming the conductive film heater 13 directly on the surface of the light transmissive cover 16. The latter case may include, for example, a configuration where an intervening layer or the like which conducts heat of the conductive film heater 13 to the light transmissive cover 16 is intervened between the conductive film heater 13 and the light transmissive cover 16, for example. For example, a void space (gap) may be present between the surface of the conductive film heater 13 and the surface of the light transmissive cover 16, or the conductive film heater 13 and the light transmissive cover 16 may be adhered to each other without the void space.

The conductive film heater 13 is, for example, a transparent conductive film, and specific examples thereof include an indium tin oxide (ITO) conductive film, a zinc oxide (ZnO) conductive film, and a tin oxide ($SnO_2$) conductive film. The light transmittance of the conductive film heater 13 is not particularly limited and is, for example, 88% or more.

The light transmissive cover 16 may further include an antireflection film on one or each of both surfaces, for example. If the antireflection film(s) is disposed on the surface(s) of the light transmissive cover 16, the transmittance can be improved compared with the light transmissive cover 16 alone, for example. As a specific example, if the antireflection film is disposed on one of the surfaces of the light transmissive cover 16, about 4% of the transmittance can be improved, and if the antireflection film is disposed on each of the both surfaces, about 8% of the transmittance can be improved, for example. If the light transmissive cover 16 includes an antireflection film on the surface on which the conductive film heater 13 is disposed, the antireflection film is disposed on the conductive film heater 13 disposed on the light transmissive cover 16, for example.

The conductive film heater 13 can be formed on the surface of the light transmissive cover 16 (surface on the inner side of the casing 14) after forming an electrode by printing or the like, for example. A method for forming the conductive film heater 13 is not particularly limited, and examples thereof include: deposition methods such as vacuum deposition and cluster beam deposition; a sputtering method; a sol-gel method, and pulsed laser deposition (PLD).

The electrode of the conductive film heater 13 is not particularly limited. When a pair of electrodes are disposed, the distance between the electrodes is not particularly limited and is, for example, 80 to 180 mm. The length of each electrode is not particularly limited and is, for example, 30 to 150 mm. In the conductive film heater 13, the site at which the electrode is disposed is not particularly limited and may be, for example, the vicinity of the outer periphery of the conductive film heater 13.

In the lamp of the present invention, a power consumption, a temperature increase, and the like of the conductive film heater 13 are not particularly limited and can be, for example, under the following conditions. The present invention, however, is by no means limited thereto. If the conductive film heater 13 is under the conditions where the size is 60 cm$^2$, a distance between electrodes is 12 cm, the length of each electrode is 5 cm, the surface resistance is 400 $\Omega/cm^2$, required power is, for example, 60 V, 0.16 A, and 10 W at 25° C. of a setting of temperature increase and is, for example, 80 V, 0.2 A, and 16 W at 40° C. of a setting of temperature increase. The same applies to the case where the conductive film heater 13 is, for example, a size in which the conductive film heater 13 is disposed on the entire surface of the light transmissive cover 16. The thickness of the conductive film heater 13 can be relatively decreased, and light transmittance can be relatively increased by relatively increasing the surface resistance of the conductive film heater 13, for example.

The material for forming the case 14 is not particularly limited and examples thereof include aluminium and resins. The shape of the casing 14 is not particularly limited and can be, for example, an umbrella-like shape as shown in FIG. 1.

In the lamp 10 according to the present embodiment, a conductive film heater 13 is disposed on the surface of a light transmissive cover 16, and heat of the conductive film heater 13 thus can be transferred to the light transmissive cover 16. Accordingly, for example, the snow accretion on the light transmissive cover 16 can be prevented, and re-freezing of melted snow on the surface of the light transmissive cover 16 can also be prevented.

For example, the conductive film heater 13 can increase in temperature up to several tens of degrees Celsius (e.g., about 50° C.) with relatively low power consumption. Thus, for example, even if the lamp 10 is used in extreme cold climate areas where the temperature is minus several tens of degrees Celsius (e.g., −40° C.), the temperature of the light transmissive cover 16 can be the temperature at which snow melts (e.g., 0° C. or more) with low power consumption. For example, as a specific example, it can be said that if the size of the conductive film heater 13 is 60 cm$^2$, the temperature is raised by 40° C. at 16 W, the power consumption for the effect of the temperature rise is less than that in the case of using a hot-wire heater. For example, it is necessary to provide a heat wire near the center of a lamp to raise the temperature at the center of the front surface of the lamp, but this significantly reduces the light transmittance. Thus, the power consumption is required to be further increased for the lamp using a hot-wire heater to improve brightness. In contrast, the present invention uses, for example, a conductive film heater such as a transparent conductive film heater, and thus, a reduction in light transmittance can be prevented, and a power consumption can be kept low.

If any object is present in a region through which light passes between the LED module 11 and the light transmissive cover 16, the amount of light reaching the light transmissive cover 16 may be reduced. However, the conductive film heater 13 has an excellent light transmittance, for example, and thus can prevent the reduction in transmittance of light emitted from the LED module 11. Thus, for example, the brightness of the LED module 11 serving as a light source can be avoided from being greatly improved based on the reduction in light transmittance, for example.

Figure 3:
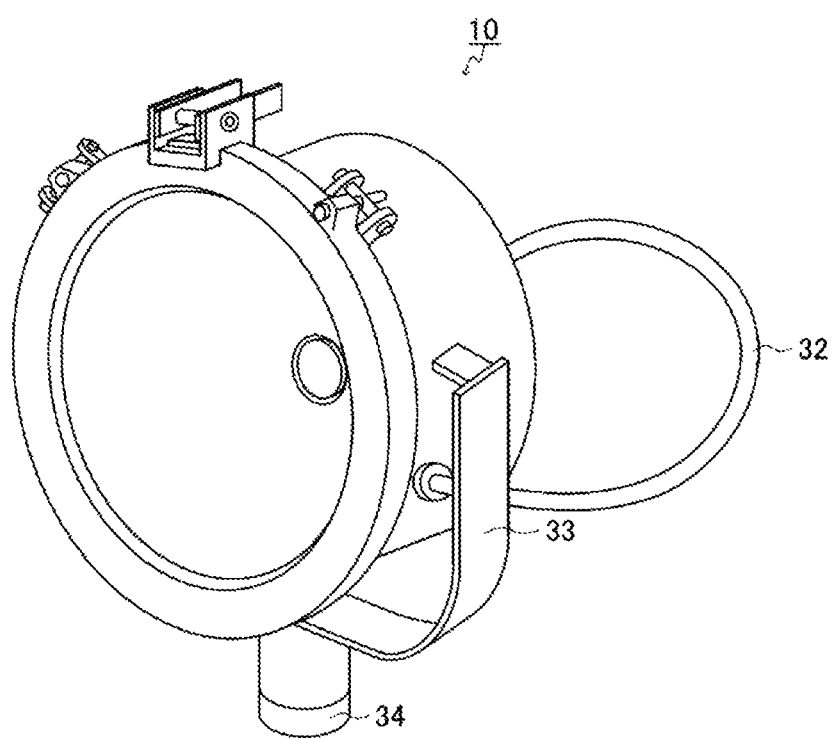
FIG. 3 is a perspective view showing an example arrangement of the lamp according to the first embodiment.
Figure 4:
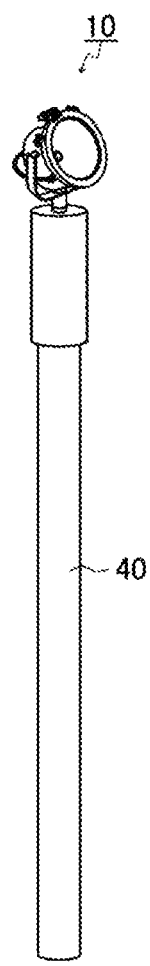
FIG. 4 is a perspective view showing another example arrangement of the lamp according to the first embodiment.

Next, an arrangement example of the lamp 10 according to the present embodiment is described with reference to FIGS. 3 and 4. In addition to the components in FIGS. 1 and 2, the lamp according to the present embodiment may further include an arm 33 and a leg 34, and may be arranged on the ground by the leg 34. The lamp 10 according to the present embodiment may further include, for example, a cable 32 for supplying power to the LED module 11 and the conductive film heater 13. The lamp 10 according to the present embodiment may be arranged on a pole 40 arranged on the ground as shown in FIG. 4, for example, and the number of the lamps is not particularly limited.

The lamp 10 according to the present embodiment is configured so that it can flash 120 times per 1 minute. For example, if the lamp 10 is arranged in a large airport having a plurality of runways, about 8 to 29 lamps are arranged at intervals of about 30 m from the approaching side of the aircraft toward the end of the runway. If the lamp 10 is arranged in a small airport having only one short runway where the number of aircrafts arriving and departing is small, the lamp 10 is arranged so that a total of two lamps can flash (blink) at the same time on both sides in the short-side direction at the end of the runway. If the lamp 10 is arranged in an airport where the aircraft cannot approach the runway straight, the lamp 10 is arranged at a required location on an approach course of the runway, for example, every several kilometers. The lamp 10 is configured so that the brightness is switchable among three levels according to the standard specifications of the Ministry of Land, Infrastructure, Transport and Tourism. Among these three levels of brightness, the brightest level "High" is used, for example, during the daytime of poor visibility due to fog, rain, etc., the darkest level "Low" is used, for example, at night, and the intermediate level "Middle" is used, for example, in the evening etc.

The lamp of the present invention can be used not only for aircraft landing guidance flash devices, but also for traffic lights in cold climate areas, for example, and for various other applications in which prevention of snow accretion or freezing of melted snow is required.

Although the present invention is described above with reference to the embodiment, the present invention is not limited thereto. Various modifications can be made within the scope of the present invention which can be understood by those skilled in the art.

INDUSTRIAL APPLICABILITY

The present invention can provide a lamp using an LED(s) capable of preventing snow accretion and freezing of melted snow. The lamp of the present invention can be used for various applications in which prevention of snow accretion or freezing of melted snow is required, such as, for example, aircraft landing guidance flash devices and traffic lights.

REFERENCE SIGNS LIST 10 lamp
11 LED module
12 light distribution unit
13 conductive film heater
14 casing
16 light transmissive cover

The invention claimed is:

1. A lamp comprising:
an LED module serving as a light source;
a light distribution unit;
a conductive film heater;
a casing comprising an opening; and
a single light transmissive cover, wherein
a brightness of the light source is switchable among three levels including a high level, a middle level, and a low level,
the LED module comprises a plurality of LEDs and an LED substrate on which the plurality of LEDs are mounted,
the LED module, the light distribution unit, and the conductive film heater are disposed in the casing,
the light distribution unit comprises at least one of a reflector or a lens disposed on a light emitting side of the LED module,
the light transmissive cover is disposed over the opening of the casing,
the light transmissive cover includes an antireflection film on each of both surfaces of the light transmissive cover, the conductive film heater is a transparent conductive film and, an electrode is disposed on an outer periphery of the conductive film heater,
the conductive film heater is disposed on a surface of the light transmissive cover on an inner side of the casing, and is directly formed in a region including a center of the light transmissive cover in a plane direction in a light transmission region, and
the light transmission region is a region through which light passes in a space between the LED module and the light transmissive cover.

2. The lamp according to claim 1, wherein the conductive film heater is an ITO conductive film.

3. The lamp according to claim 1, wherein
the reflector has a tubular shape,
the LED module is disposed at an opening of the reflector on the light source side, and
an LED-mounting surface of the LED substrate faces an opening of the reflector on a light emitting side.

4. The lamp according to claim 1, for use in an aircraft landing guidance flash device.

5. The lamp according to claim 1, wherein the light source flashes 120 times per minute.

* * * * *